US008298459B2

(12) United States Patent
DeCusatis et al.

(10) Patent No.: US 8,298,459 B2
(45) Date of Patent: Oct. 30, 2012

(54) SPIN-MOUNTED FABRICATION OF INJECTION MOLDED MICRO-OPTICS

(75) Inventors: Casimer M. DeCusatis, Poughkeepsie, NY (US); Lawrence Jacobowitz, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/603,567

(22) Filed: Oct. 21, 2009

(65) Prior Publication Data

US 2011/0089589 A1    Apr. 21, 2011

(51) Int. Cl.
    B28B 1/20    (2006.01)
(52) U.S. Cl. .......................... 264/2.1; 264/310; 264/311
(58) Field of Classification Search ............... 264/2.1, 264/270, 310, 311, 312, 313, 314, 315, 316, 264/317; 425/425, 434
    See application file for complete search history.

(56) References Cited

U.S. PATENT DOCUMENTS

| | | | | |
|---|---|---|---|---|
| 4,541,969 A | * | 9/1985 | Neefe ............. | 264/2.1 |
| 4,590,018 A | * | 5/1986 | Neefe ............. | 264/2.1 |
| 4,637,791 A | * | 1/1987 | Neefe ............. | 425/425 |
| 5,298,366 A | | 3/1994 | Iwasaki .......... | 430/321 |
| 5,435,818 A | * | 7/1995 | Mashige et al. .. | 264/2.2 |
| 5,629,800 A | | 5/1997 | Hamblen ......... | 359/565 |
| 5,718,849 A | | 2/1998 | Maus et al. ..... | 264/2.2 |
| 6,099,283 A | | 8/2000 | Soanne et al. ... | 425/123 |
| 6,103,148 A | * | 8/2000 | Su et al. ........ | 264/2.2 |
| 6,171,885 B1 | | 1/2001 | Fan ............... | 438/70 |
| 6,410,213 B1 | | 6/2002 | Raguin .......... | 430/321 |
| 6,482,669 B1 | | 11/2002 | Fan ............... | 438/70 |
| 6,822,799 B2 | | 11/2004 | Kitamura ........ | 359/622 |
| 6,909,554 B2 | | 6/2005 | Liu ............... | 359/626 |
| 7,009,772 B2 | | 3/2006 | Hsiao ............. | 359/619 |
| 7,372,497 B2 | | 5/2008 | Weng ............. | 348/340 |
| 7,399,421 B2 | | 7/2008 | Jacobowitz ...... | 216/24 |
| 7,486,854 B2 | | 2/2009 | Van Ostrand .... | 385/31 |
| 7,515,357 B2 | | 4/2009 | Segawa .......... | 359/740 |
| 7,518,676 B2 | | 4/2009 | Minoura ......... | 349/113 |
| 7,522,314 B2 | | 4/2009 | Atkins ........... | 358/3.27 |
| 7,524,770 B2 | | 4/2009 | Park .............. | 438/713 |
| 7,531,104 B1 | | 5/2009 | Hwu .............. | 216/80 |

(Continued)

OTHER PUBLICATIONS

Victor Lien et al, "Microspherical surfaces with predefined focal lengths fabricated using microfluidic capillaries", Applied Physics Letters, vol. 83, No. 26, pp. 5563-5565 (2003).

(Continued)

Primary Examiner — Joseph Del Sole
Assistant Examiner — Timothy Kennedy
(74) Attorney, Agent, or Firm — Steven Chiu; Ido Tuchman

(57) ABSTRACT

Methods and systems for fabrication of injection molded optical components are disclosed. In one embodiment, a moldplate having one or more cavities is configured to receive injected optical material within walls of the cavities. The cavities are designed with a predetermined geometric profile approximately corresponding to a predetermined optical profile of an optical element to be formed therein. When molten optical material is injected into the cavities of the moldplate, the injected optical material forms a meniscus due to surface tension between the optical material and the wall of the cavities. The meniscus thus provides a shape corresponding to the predetermined optical profile. The optical material is then rapidly cured with actinic radiation, and a desired optical element with high-precision dimensions is formed within the cavities of the moldplate. In some embodiments, the moldplate is spun around a spin axis such that the meniscus is adjusted to match the predetermined optical profile within a certain tolerance.

17 Claims, 7 Drawing Sheets

U.S. PATENT DOCUMENTS

| | | | |
|---|---|---|---|
| 2002/0104823 A1 | 8/2002 | Cunningham | 216/24 |
| 2003/0020799 A1* | 1/2003 | Koga et al. | 347/238 |
| 2003/0112523 A1 | 6/2003 | Daniell | 359/626 |
| 2005/0018595 A1* | 1/2005 | Conroy et al. | 369/288 |
| 2005/0242271 A1 | 11/2005 | Weng et al. | 250/208.1 |
| 2007/0029277 A1 | 2/2007 | Jacobowitz et al. | 216/24 |

OTHER PUBLICATIONS

Office Action for U.S. Appl. No. 12/603,565 dated Apr. 26, 2011.
Office Action for U.S. Appl. No. 12/603,565 dated Sep. 23, 2011.
Office Action for U.S. Appl. No. 12/603,569 dated Oct. 28, 2010.
Office Action for U.S. Appl. No. 12/603,569 dated Apr. 13, 2011.

* cited by examiner

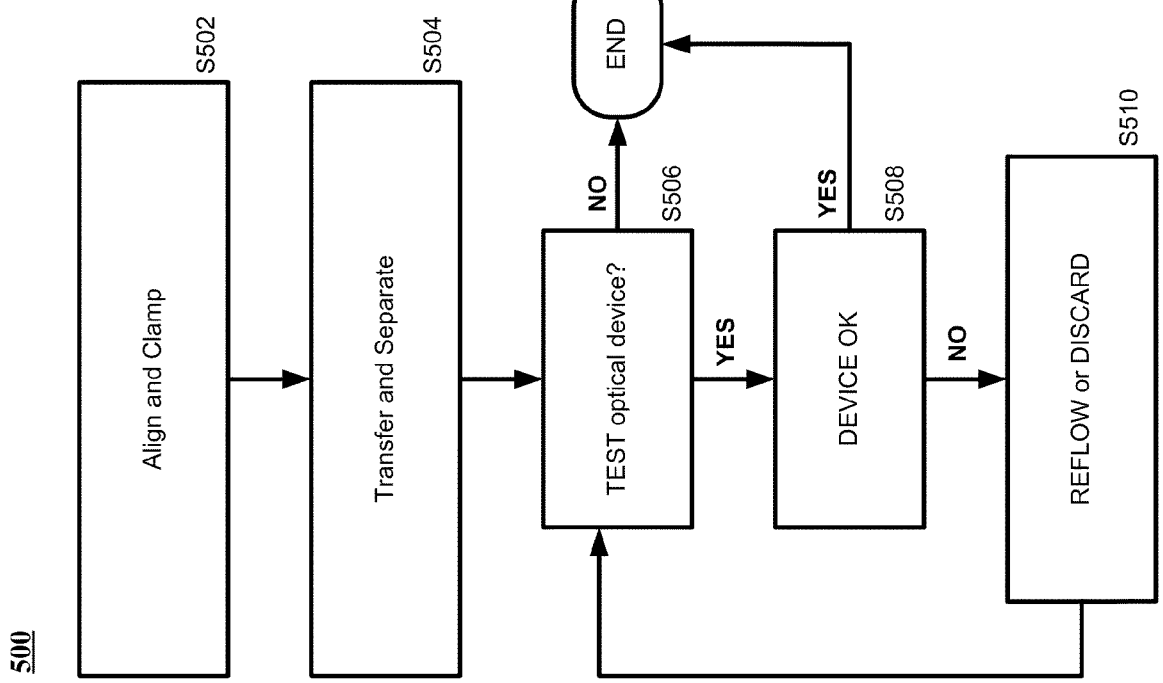

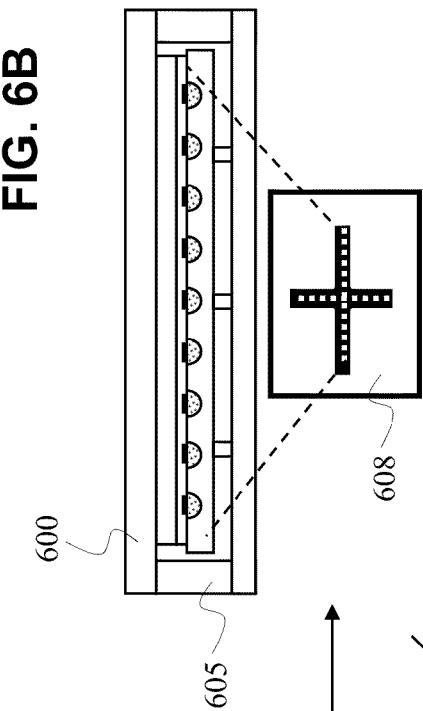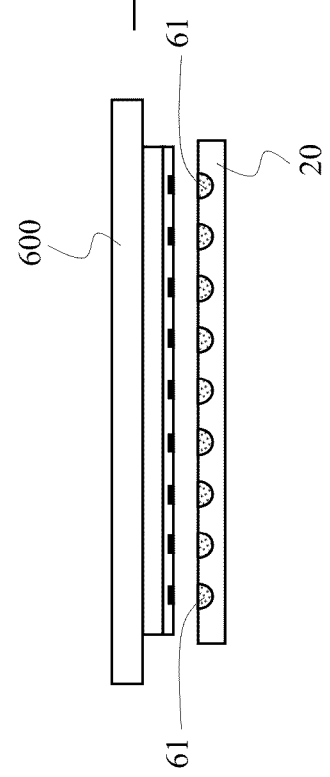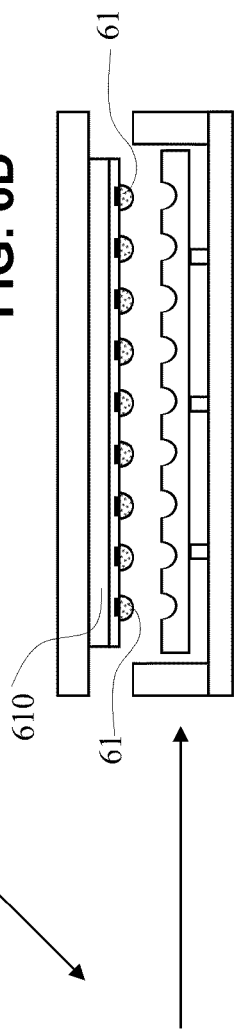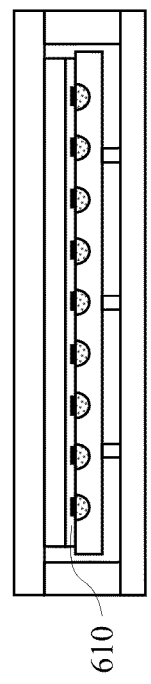

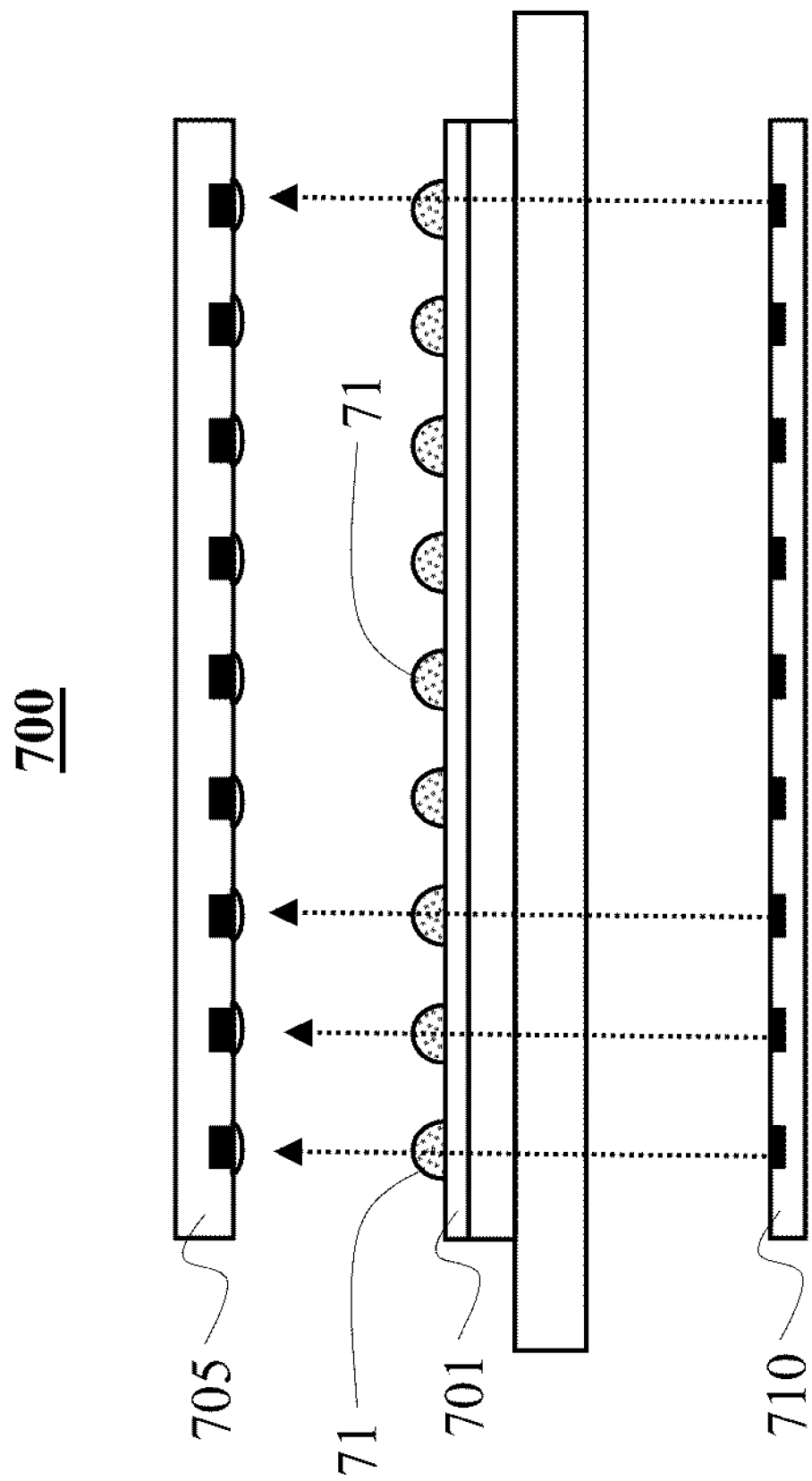

SPIN-MOUNTED FABRICATION OF INJECTION MOLDED MICRO-OPTICS

CROSS-REFERENCE TO RELATED APPLICATIONS

This application is related to copending applications U.S. patent application Ser. No. 12/603,565 and U.S. patent application Ser. No. 12/603,569, filed concurrently herewith. The disclosure of the related applications is incorporated herein by reference in its entirety for all purposes.

FIELD OF INVENTION

The present invention relates to injection molding of objects. More specifically, the present invention relates methods and systems for manufacturing highly precise injection molded optical elements, where surface tension of the injected optical material near walls of a moldplate cavity provides a meniscus with a curvature corresponding to a predetermined optical profile. The optical elements are preferably in the micro or nanometer scale.

BACKGROUND OR RELATED ART

A variety of manufacturing techniques such as hot embossing, casting, and injection molding have been used to produce optical elements in the micrometer scale. Of those techniques, injection molding has been found to be preferable over the others because it allows for high production output rates with very short processing times. Conventional injection molding of optical elements, such as lenses, filters or optical waveguides involve the injection of molten optical materials (typically a polymer) into a moldplate that contains one or more cavities with predetermined optical patterns to be replicated.

After the molten optical material has been injected into the moldplate cavities, the optical material is cured and the desired optical element with a predetermined optical pattern (e.g., curvature, diameter, focal length and the like) is formed inside the cavities of the moldplate. The thus formed optical element is then extracted from the moldplate using a vacuum chuck or a similar mechanical apparatus. Removing the newly formed optical element from the moldplate cavities is often difficult, especially if the optical material remains adhered to the walls of the cavities. To prevent or minimize adhesion of the optical material to the moldplate cavities, a conformal coat of release layer is conventionally applied to the surfaces of the moldplate cavities. This release layer is generally damaged when the optical element is removed from the moldplate. Consequently, the damaged release layer is removed, and a new release layer is applied for the injection molding of a new optical element. Evidently, the structure of the moldplate cavities is a critical component in an injection molding system.

Newer micro and nanometer optical applications require optical elements with very shallow radius of curvature and very precise dimensions (e.g., micro-lenses with a radius of curvature in the order of few hundred nanometers to less than one micron are highly desirable for applications such as integration of CMOS or CCD digital cameras in mobile telephones, optical-couplers for solid-state lasers and photodetectors, launch device elements for optical fiber communications, optical fiber interconnection, optical waveguides, muxes for WDM, planar lightwave circuits, photonic devices, and solar cells for electricity generation. However, high-precision polymer optical components are very difficult to fabricate by the method of injection molding because very high temperatures are required to melt the polymer optical material for injection, and at the same time, rapid cooling of the molten material is desired for efficient mass-production. This fast change in temperature often causes damage to the cooled polymer and prevents the proper formation of an optical element with highly precise dimensions. In addition, other complications of the injection molding process are burning or scorching of parts due to melt temperature being too high or curing cycle time being too long; warping of parts due to uneven surface temperature of the moldplate cavities; surface imperfections and bubbles due to incomplete filling, surface cracking due to rapid change of temperature, and the like. It is furthermore a significant economic advantage to enable the attachment of optical elements directly to optoelectronic devices with lithographic precision at the wafer-scale or large substrate level in manufacturing of optoelectronic and optomechanical subsystems.

In order to obtain high-precision optical elements, it is thought that, in principle, high precision moldplate cavities combined with slow cooling of the injected optical material could provide the required precise dimensions. However, a high precision moldplate would result in a very costly and low re-utilization solution. Moreover, a slow cooling process would result in increased production times which may be unsuitable for efficient mass-production of optical elements.

In view of the foregoing and other considerations, there is a clear need to develop a low-cost, high-reutilization moldplate that would allow for the manufacture of very precise optical elements with rapid turnaround time.

SUMMARY

In accordance with at least one embodiment of the present invention, highly precise micro and nanometer scale optical elements may be obtained by providing a moldplate made of predetermined moldplate material, the moldplate having one or more cavities configured to receive injected optical material within walls of the one or more cavities, each of the one or more cavities having a predetermined geometric profile approximately corresponding to a predetermined optical profile; injecting the optical material into the one or more cavities of the moldplate, the injected optical material forming a meniscus due to a surface tension of the optical material contained within the walls of the one or more cavities, the meniscus having a shape corresponding to the predetermined optical profile; curing the optical material contained within the walls of the one or more cavities such that an optical element having the predetermined optical profile is formed in each of said one or more cavities of the moldplate. In some embodiments, the shape of meniscus is adjusted to match the predetermined optical profile by spinning the moldplate about a spin axis. Additional parameters at the control of the optical designer and the manufacturer are the optical polymer viscosity, material composition, optical absorptivity and spectral transmissivity, rheologic and surface polarizability properties, and, dependence of these parameters on temperature.

Whether the predetermined optical profile is obtained solely by the meniscus effect or by enhancing the meniscus effect by spinning the moldplate, the optical elements formed within the walls of the one or more cavities of the moldplate are removed (i.e. separated) therefrom by shrinking the optical material such that the optical element pulls away from the walls of the one or more cavities due to a differential thermal expansion between the optical material and the moldplate material.

In any of the disclosed embodiments, the curing step includes exposing the optical material contained within the walls of the one or more cavities to pulsed UV light at a predetermined power, such that the optical material forming the optical element shrinks at least 1% by volume of the optical element.

In some embodiments, the predetermined moldplate material includes at least one of metal and glass, while the optical material includes at least one of a polymer material and a material susceptible to photopolymerization.

In the various embodiments, it may be preferable that the walls of the one or more cavities include at least one of a perpendicular wall, a chamfered wall and a curved wall selected in accordance with the predetermined geometric profile. In addition, the one or more cavities are preferably concentric to the spin axis, and the shape of the meniscus in each of the one or more cavities is adjusted in correspondence with a position of the one or more cavities with respect to said spin axis. Moreover, the shape of the meniscus is adjusted in accordance with at least one of a viscosity of the optical material, a temperature of the optical material, a spin rate of the moldplate, a desired curvature of the optical element, the predetermined geometric profile of the cavity, a wall of the cavity, and a curvature of the predetermined optical profile.

An apparatus for fabrication of high precision injection molded optical elements is also disclosed. The apparatus is configured to control all of the injection parameters, as well as the spinning rate of the moldplate such that a desired optical element can be reliably produced within rapid turnaround time. The apparatus includes: a moldplate made of a predetermined moldplate material and having one or more cavities configured to receive injected optical material within walls of the one or more cavities, each of the one or more cavities has a predetermined geometric profile approximately corresponding to a predetermined optical profile; an injecting device configured to inject the optical material into the one or more cavities of the moldplate, wherein the injected optical material forms a meniscus due to a surface tension of the optical material contained within the walls of the one or more cavities, the formed meniscus preferably has a shape corresponding to the predetermined optical profile; a curing device is configured to cure the optical material injected into the one or more cavities such that an optical element having the predetermined optical profile is formed in each of the one or more cavities of said moldplate.

Other embodiments and advantages thereof may be readily inferred by those of ordinary skill in the art, by reading the detailed description of the disclosure in reference to the attached drawings. It is recognized and specifically identified that the methods and apparatus of the present invention enable the lithographically precise alignment and attachment of large arrays of optical elements to large arrays of electronic, optoelectronic and mechanical devices (e.g., MEMS).

BRIEF DESCRIPTION OF THE SEVERAL VIEWS OF THE DRAWINGS

FIG. 5 illustrates exemplary steps for a post injection process, in accordance with an embodiment of the present invention.

FIGS. 6A to 6D show a process sequence for alignment, clamp, transfer and separation of newly formed optical elements in the post injection process of FIG. 5.

FIG. 7 is an exemplary arrangement for testing newly formed optical components during the post injection process of FIG. 5.

DETAILED DESCRIPTION

Figure 1:
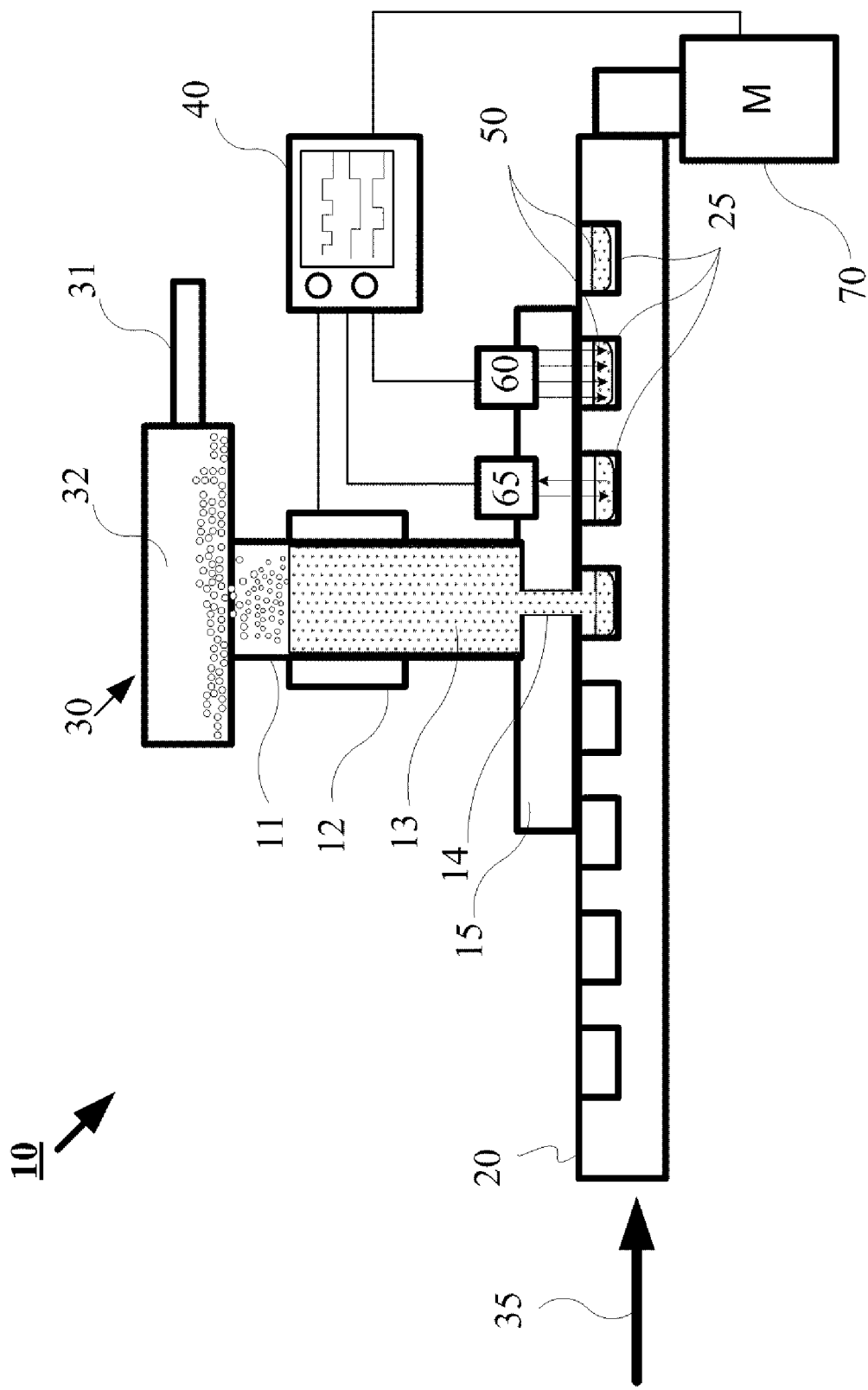
FIG. 1 is a schematic representation of an exemplary injection molding system, as contemplated by one embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification and claims, specify the presence of stated features, integers, steps, operations, elements, and/or components, but do not preclude the presence or addition of one or more other features, integers, steps, operations, elements, components, and/or groups thereof. In the following description, reference is made to the accompanying drawings where like reference numerals refer to like parts throughout the disclosure.

The Meniscus Effect

Because the embodiments of the present invention are partly based on the concept of the "meniscus effect", it is convenient to discuss such a concept before delving in the details of the various embodiments. As used in this specification, the meniscus effect refers to a curvature on the surface of a liquid. More specifically, when the surface of a liquid is near the walls of a container, this liquid surface is curved because of surface tension between the molecules of the liquid and those of the container walls. Thus, for purposes of this specification, the meniscus effect may be broadly defined as a curve in the surface of molten optical material, where said curve is produced in response to surface tension between the optical material and the walls of a container.

A meniscus created by surface tension of a liquid can be either concave or convex. A convex meniscus is produced when the molecules of the liquid have stronger attraction to each other than to the walls of the container. A typical example of a convex meniscus may be observed when liquid mercury is deposited into glass barometers. A concave meniscus, on the other hand, is produced when the molecules of the liquid attract those of the container walls. One example of a concave meniscus can be observed when water is deposited into glass containers.

It should be noted that surface tension is not a property of the liquid alone, but rather it is a property of the liquid's interface with another medium. In the context of this specification, surface tension is produced namely by the interface between the surface of the liquid and the surface of the walls of the container. Where the two surfaces meet, they form a contact angle. The contact angle is the angle the tangent to the liquid makes with the walls of the container. Thus, in the context of contact angles, a concave meniscus has a contact angle less than 90 degrees, and a convex meniscus has a contact angle greater than 90 degrees.

Different types of container walls produce a different meniscus effect. For example, if the surface of the liquid is perpendicular to the container wall, the meniscus is a perpendicular meniscus with a predetermined curvature and height. However, if the liquid surface faces a curved or chamfered wall the meniscus has a curvature and height different than that of the perpendicular meniscus. One aspect of the present invention is directed to the use of the meniscus effect to manufacture high-precision optical elements by inject molten optical material (preferably in liquid state) into selectively designed moldplate cavities such that a micro-meniscus effect takes place between the walls of the cavities and the surface of molten optical material. When the walls of the cavities are designed with geometries that approximately correspond to a desired optical profile, it is possible—due to the meniscus effect—to obtain a desired optical element with high-precision dimensions. Further details related to the design of moldplate cavities are discussed in the detailed description of FIG. 2.

Some of the advantages of fabricating micro-optical components by using the meniscus effect are: (1) that moldplates cavities with high-precision dimensions are not required; (2) the cost of fabricating specialized moldplates can be reduced; (3) the moldplate can be reused numerous times because the curvature of the optical element is obtained by surface tension (meniscus effect) rather than the shape of the cavities alone; (4) the walls of the cavities may be shaped to provide the desired meniscus curvature of the optical element; (5) the unique combination of the meniscus effect with photopolymerization enables the design of optical properties and mechanical shapes of micro-optic elements and devices not accessible in the prior art; and (6) lithographic alignment keys for the precise attachment of large arrays of micro-optic elements to large arrays of mechanical, electrical and optoelectronic devices at the wafer-scale or large-substrate (e.g., LCD matrix display) level.

System for Fabrication of Injection Molded Micro-Optics

At least one embodiment of the present invention discloses a system and method for the formation of optical elements such as lenses and the like by an injection molding process. In particular, a method for manufacturing high-precision optical elements with a simplified moldplate structure is disclosed. In accordance with at least one embodiment, the present invention enables the formation of high-precision optical elements by: directly injecting optical material into selectively designed cavities of a moldplate, each of the cavities having a predetermined geometric profile approximately corresponding to a predetermined optical profile, wherein the injected optical material forms a meniscus due to a surface tension of the optical material contained within the walls of the cavities, the meniscus having a shape corresponding to the predetermined optical profile; rapidly curing the injected optical material in a controlled manner with high intensity actinic radiation immediately after the material is injected such that a predetermined optical element is formed from the injected optical material; and separating the thus formed optical element from the cavities of the moldplate preferably due to a differential thermal expansion between the optical material and the moldplate material. In the foregoing embodiment, the curvature of the meniscus formed by the surface tension can be controlled by spinning the moldplate around a spin axis such that an optical element with a high-precision optical profile is obtained. Various methods for controlling the spinning of the moldplate are discussed.

Subsequent to, or concurrent with, the separation of the optical element, the optical element may be transferred onto an active optoelectronic devices such as light pickup or light emitting means, as more fully discussed in the "Post-injection Processes" section described herein below.

The teachings of the present invention may be applicable to the manufacture of optical components in the micro and/or nanometer scale, such a microlenses, microfilters, nano-optical waveguides and the like, which are typically formed as planar optic arrays. Optical components with symmetric geometries such as spherical sections are preferred since the forces generated by the differential thermal expansion between the optical material and the moldplate material are strategically controlled to be symmetrical and thus less likely to deform or damage the optical element. However, the systems and methods disclosed herein may also be applicable to injection molding processes for the fabrication of any type of optical elements including spherical and aspherical elements used in mobile cameras and video phones, micro-projection systems, or any other application that uses micro-optical elements.

FIG. 1 is a schematic representation of an exemplary injection molding system 10 for use in the method, as contemplated by one embodiment of the present invention. Injection molding system 10 includes a moldplate 20, an injection machine 30 a control station 40, a curing device 60, a surface sensor 65, a filling platen 15, and a motor (M) 70. In operation, the various components of injection molding system 10 serve to form an optical element 50.

The moldplate 20 is preferably made of a predetermined moldplate material having a low coefficient of thermal expansion (CTE), such as metal (e.g., molybdenum or nickel), silicon graphite, glass or other materials. For purposes of illustration, it is preferable that the CTE of the moldplate material be much lower than the CTE of the optical material 13 such that under the curing effect of actinic radiation the optical material shrinks at a higher rate that the moldplate material. More specifically, it is preferable that the CTE of the optical material and the CTE of the moldplate material differ by at least 10%. In this manner, the moldplate material would shrink a 10% of the amount of shrinkage experienced by the optical material.

The moldplate 20 includes a plurality of cavities 25 configured to receive an appropriate optical material 13 within the walls of the cavities. Each of the cavities 25 is preferably designed with a predetermined geometrical profile, which approximately corresponds to a predetermined optical profile of optical element 50 desired to be replicated in the injection molding system 10. That is, each cavity 25 may be designed with at least a preferred diameter and depth that can approximately correspond to the diameter and thickness, respectively, of the desired optical element. In addition, each cavity 25 may be designed with a preferred wall geometry so as to achieve a desired meniscus effect, as more fully described below in reference to FIG. 2.

Figure 2:
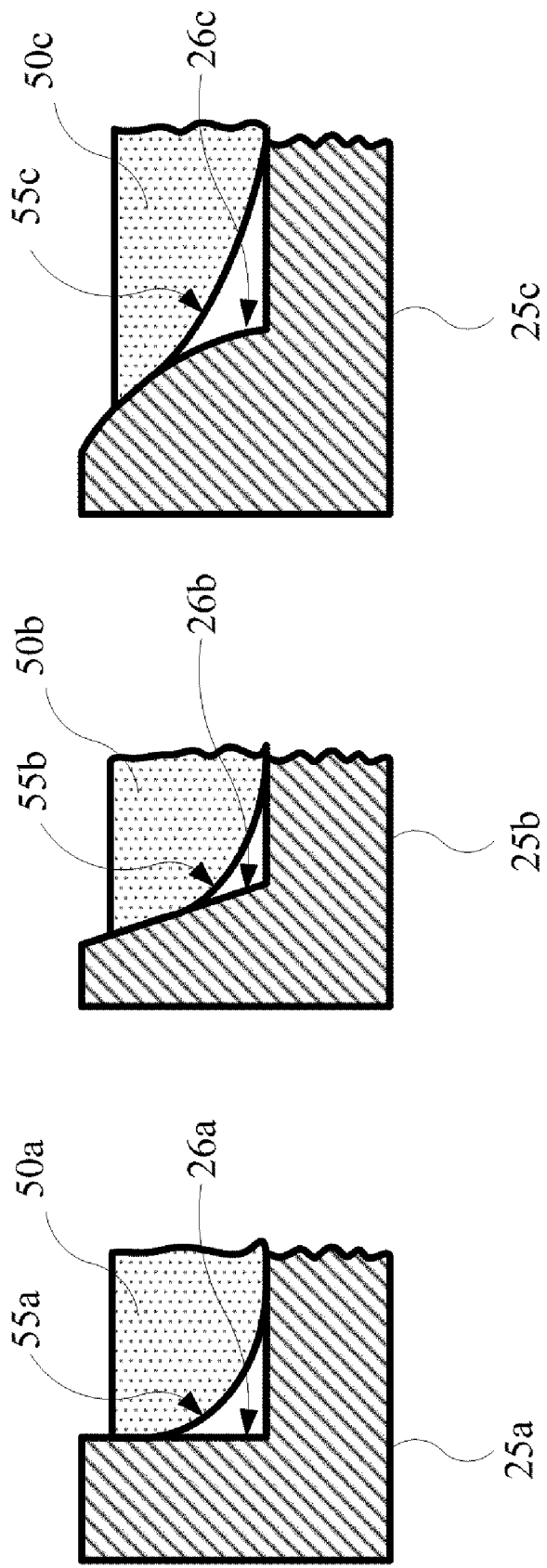
FIG. 2 illustrates cross-sectional views of the three different geometries of cavities, in which three different meniscus curvatures are comparatively illustrated.

As used herein, a predetermined geometrical profile for a cavity 25 may include, for example, a preferred geometry for the walls of the cavities. More specifically, as previously discussed, different container walls produce different curvatures in the meniscus effect. Accordingly, the cavities 25 can be designed with predetermined geometries such that a desired meniscus curvature is obtained. FIG. 2 illustrates cross-sectional views of the three different geometries of cavities 25, in which three different meniscus curvatures are comparatively illustrated.

Figure 3:
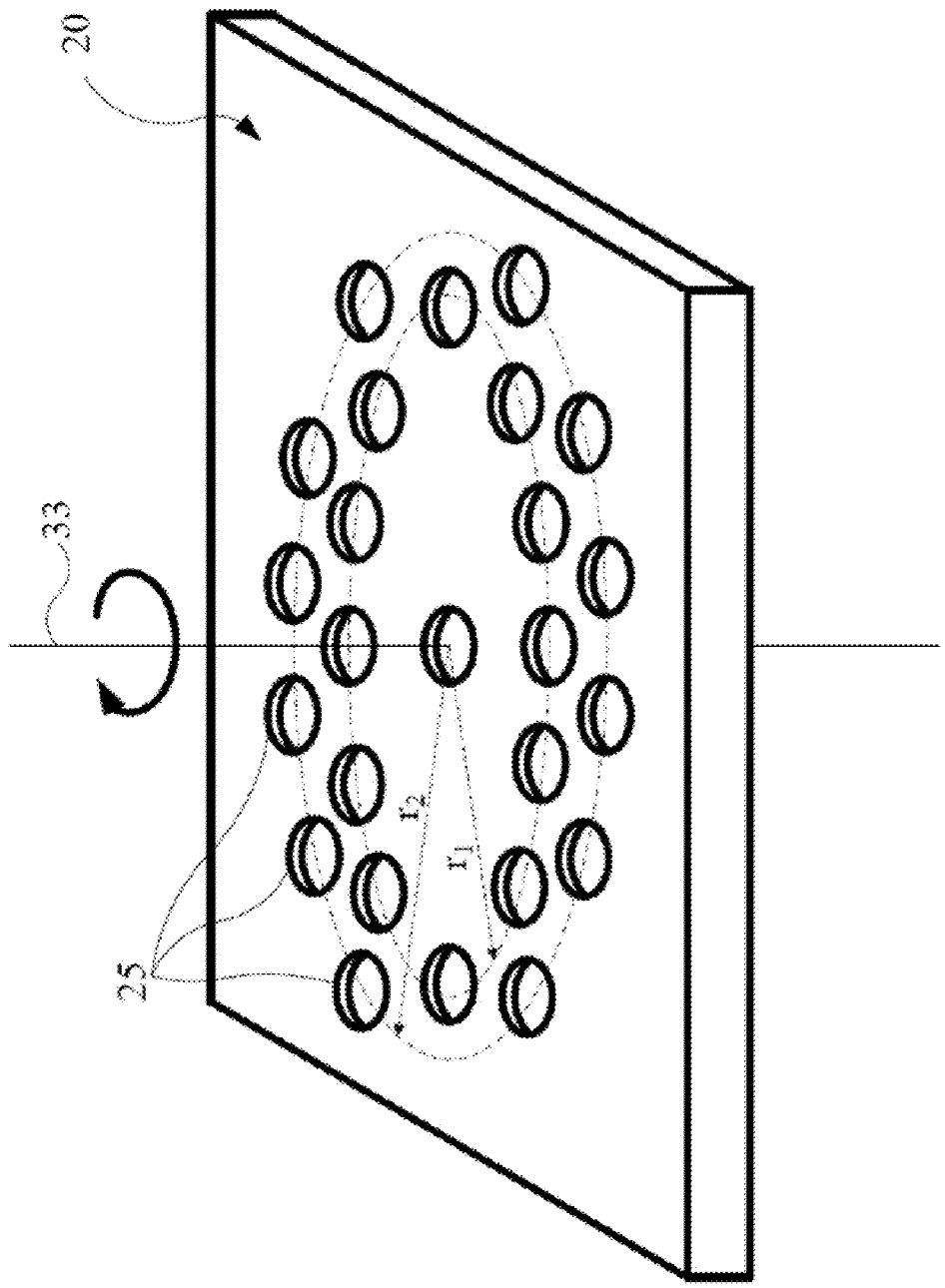
FIG. 3 illustrates an example of a moldplate having a plurality of cavities arranged concentric to a spin axis.

In FIG. 2, cavity 25a is shown as having a perpendicular wall 26a in which an optical element 50a with a first meniscus curvature 55a can be formed. Similarly, cavity 25b shows a chamfered wall 26b, in which an optical element 50b with a second meniscus curvature 55b may be formed. Finally, cavity 25c depicts a rounded (i.e. curved) wall 26c, in which an optical element 50c having a third meniscus curvature 55c can be produced. It should be noted that each of the three different wall geometries in cavities 25a to 25c are configured to produce a different meniscus curvature. That is, cavity walls with different shapes (geometries) can provide differences in contact angle between the injected optical material and the cavities' walls. As a result, shallow curvatures for optical elements 50 can be readily obtained by designing cavities with predetermined geometries (e.g., with chamfered or curved walls) that can provide a substantially flat meniscus. In addition, as discussed more in detail below, it should be noted that the desired meniscus effect can be obtained either solely due to the surface tension of the injected optical material contained within the walls of the cavities 25, or it can be obtained by combining the surface tension with a controlled centripetal force, by spinning the moldplate 20 around an spin axis 33 (as shown in FIG. 3).

In some embodiments, the contact angle of the injected optical material with the walls of the cavities, and thus the curvature of the meniscus, can be controlled by specifically designing the type of surface of the container (cavity) wall and/or the level of surface tension of the injected optical material 13. More specifically, the surface of the container wall can be, for example, monolithically fabricated of (or coated with) selected materials that can provide the proper surface tension to the molten optical material so that an appropriate meniscus curvature can be obtained. In addition, the viscosity and/or temperature of the injected optical material can be controlled such that the surface tension of the optical material provides the desired meniscus curvature.

From the description of FIG. 2, it should be recognized that it is possible to design various combinations of cavity wall shapes to achieve different radii of curvature on any optical element desired to be replicated. In addition, it should be noted that the moldplate cavities can be fabricated by merely approximating the shape of the cavity to the dimensions of the desired optical element. As a result, the moldplate can be fabricated with less restrictive tolerances and at lower cost. In addition, because a high-precision optical profile of the desired optical element is obtained due to the meniscus effect, the moldplate cavities can be reused numerous times before requiring maintenance. As an example, it is estimated that depending on the level of accuracy required in the optical element, a moldplate may be reused between 10 to 20 times before requiring replacement or maintenance. Evidently, this level of reutilization constitutes a big improvement when compared with conventional moldplate technology in which the coat of release layer, for example, is generally replaced for every injection molding process.

Referring back to FIG. 1, the injection molding machine 30 (injection device) may include: a material hopper 32 having a pressure inlet 31; a heated barrel 11 that is heated by a heating element 12; a filling platen 15 including therein an injection nozzle 14. The injection molding machine 30 is preferably configured to heat the optical material 13 to an appropriate molten state (preferably liquid), so that the molten optical material 13 may be injected into the mold cavities 25 in a uniform and efficient manner. To that end, the temperature of the optical material 13 may be controlled by the control station 40 by regulating the heating device 12. Regulating the heating device 12 may include, for example, increasing and/or decreasing the temperature that the heating device 12 applies to heated barrel 11 such that the optical material 13 is kept at a substantially steady and uniform temperature. Preferably, the temperature of the optical material 13 is kept at a substantially steady-state melting point temperature in the range of 150 to 250° C.

In addition, the injection pressure of the optical material 13 may need to be regulated to promote expedited filling of optical material 13 into the plurality of cavities 25, and to hold (or push) the optical material 13 against the surfaces (e.g. walls) of the cavities for at least a predetermined period of time (hold period) so as to lock-in the geometrical shape and dimensions of the optical element. Thus, the shape or optical profile of the desired optical element is predetermined by the shape or profile of the cavities, the meniscus effect created by the surface tension of the optical material and the walls of the cavities, the contact angle formed by the surface of the injected optical material and the surface of the walls of the cavities, as well as the controlled shrinkage of the optical material. To provide appropriate injection pressure, a pressure inlet 31 may be implemented based on particular application requirements, such that—for example—the molten optical material 13 is uniformly injected (at a predetermined pressure and speed) from the heated barrel 11 into cavities 25 through at least one injection nozzle 14 located in the body of the filling platen 15.

A curing device 60 is provided preferably supported by, or attached to, the filling platen 15. In this manner, each cavity being filled with optical material 13 passes below the curing device 60 as the moldplate 20 moves in a scanning or step mode in direction 35. Alternatively, the injection machine 30 can move in a scanning or step mode in a direction opposite to direction 35, so as to rapidly and efficiently fill each cavity 25 with optical material 13. Moreover, either the moldplate 20 and/or injection machine 30 may be configured to mode with respect to each other in more than one direction, if appropriate and necessary.

In the embodiment of FIG. 1, the curing device 60 is preferably a source of electromagnetic radiation that can produce photochemical reactions, also know as "actinic radiation". For example, curing device 60 may preferably be a pulsed ultra violet (UV) light source, such as a UV laser, capable of delivering high intensity pulses of actinic radiation in a range from about 254 nm to 365 nm. The curing device 60 may be controlled by control station 40 so as to deliver specific pulse power, pulse intensity and/or pulse duration to optical material 13. The pulse duration, number of pulses, and other details could vary depending on the specific optical material chosen and the geometry of the optical element to be fabricated. For illustrative purposes, about 3-4 watts (W) of UV energy, delivered in a train of perhaps 5 pulses each tens of microseconds long to achieve at least 1% shrinkage by volume of the optical material may be preferable. In this manner, it is possible to create sufficient differential thermal expansion between the optical material and the moldplate material such that the optical element is separated and released from the moldplate cavity without the use of mechanical tools.

In other embodiments of the present invention, the curing device 60 may not be limited to a pulsed UV source alone. There are various sources of radiation that may be used as curing device 60. For example, actinic radiation from a variety of sources can be used, including commercial ultraviolet fluorescent tubes, medium, high, and low pressure mercury vapor lamps, argon glow lamps, photographic flood lamps, pulsed xenon lamps, carbon arc lamps, and the like. As long as the curing device is capable of achieving the at least 1% shrinkage by volume of the optical material in a short period of time and without damaging the optical element, it may be possible to create sufficient differential thermal expansion between the optical material and the moldplate material such that the optical element is separated and released from the moldplate cavity without the use of mechanical tools.

A surface sensor 65 is also provided within the structure of injection machine 30. In FIG. 1, the surface sensor 65 is depicted as being attached to filling platen 15, but other arrangements can be devised. A surface sensor 65 is a device configured to monitor and determine the level of curvature of the meniscus formed by the surface tension between the injected optical material 13 and the walls of the cavities 25. In other embodiments, surface sensor 65 may also be configured to measure parameters (such as surface roughness, meniscus curvature, thickness and the like) of the newly formed optical element 50. The meniscus curvature or other parameters can be measured, for example, by a laser triangulation sensor, confocal microscopy, holography or the like, and the results of such measurements can be stored and analyzed at control station 40. Preferably, a non-contact surface sensor 65 such as a profilometer is desirable in order to prevent damage of the optical element and/or the surface sensor itself.

Based on the meniscus curvature or other parameters measured by surface sensor 65, various parameters relating the injection of the optical material can be selectively controlled, so as to obtain the desired high-precision in the dimensions of the optical element being fabricated. For example, the shape and curvature of the meniscus can be predicted based on one or more parameters such as the initial geometry of the moldplate cavity, the viscosity of the optical material, the temperature of the optical material and the like. Thus, when the optical material 13 is injected into cavities 25, the surface sensor 65 can measure the meniscus curvature. If the meniscus curvature meets the expected dimensions, the optical material is rapidly cured. Alternatively, if the meniscus curvature does not meet the expected dimensions, one or more of the parameters relating to the viscosity, temperature and/or pressure of the optical material 13 could be controlled to achieve the desired meniscus curvature. In addition, surface sensor 65 can also be configured to measure profile parameters of the newly formed optical element 50. That is, it may be possible to determine whether the correct curvature of the optical element has been achieved, and/or whether further curing of the optical element is necessary.

Although it is possible to obtain high-precision optical elements by designing moldplate cavities with predetermined geometries that provide an appropriate meniscus effect, the precision of those optical elements can be further enhanced by spinning the moldplate 20 around a spin axis 33 (FIG. 3). To that end, a rotation device including for example a motor (M) 70 can be provided as part of the injection molding system 10. Motor 70 can be controlled by control station 40 such that an appropriate spinning rate in moldplate 20 is obtained prior to curing the injected optical material. For example, surface sensor 65 can be used to measure the meniscus curvature, as described above. In the case that the appropriate meniscus curvature has not been achieved, control station 40 may activate motor 70. Motor 70 can then spin the moldplate 20 around a spin axis 33 (shown in FIG. 3) until a predetermined spinning rate is achieved. Preferably the spinning of the moldplate 20 is monitored and controlled in correspondence with the curvature of the meniscus curvature of the injected optical material 13. To that end, surface sensor 65 may preferably monitor the meniscus curvature of the injected optical material, while the moldplate 20 rotates. When the meniscus curvature measured by surface sensor 65 is determined to match the expected curvature, the spinning of the moldplate can be stopped and the injected optical material is rapidly cured.

Optical Materials

Advantages of forming optical component by the injection molding processes of the present invention include superior optical shape control and high-precision dimensions because the optical elements are shaped not only by the cavity shape but also by the meniscus curvature. Moreover, the meniscus curvature can be further enhanced by spinning the moldplate around an optical axis, as described above. In FIG. 1, as described above, injection machine 30 is configured to inject an optical device material 13 in a molten state dispensed from the filling platen 15 through the injection nozzle 14 onto cavities 25.

The preferred materials for optical elements, in particular for elements in the micro and/or nanometer scale may include polymers, photopolymers, glasses, sol-gels, UV-curable epoxies, resins, acrylics, cycloolefins, polycarbonates, PMMA (polymethyl methacrylate), polyimide, glass semiconductors such as $Ge_xSe_{1-x}$, and, combinations thereof. In addition, polymeric composites having a high transparency, low coefficient of thermal expansion and minimum change of coefficient of refractive index with temperature are preferable. Such polymeric composites may be made from a suitable thermoplastic polymer and index-matched glass or ceramic.

Thermoplastic polymers suitable for the composites may belong to any known class of polymers including polyvinyls, polyamides, polyesters, polyolefins, polycarbonate, polyamide, polyimide, polyesteramide, polyketones, polyetherketones and the like and mixtures thereof. Polyolefins include polyalkenes (such as, for example, polyethylene, polypropylene, polybutylene), polystyrene, and polymers containing cyclic olefin moieties. Suitable glasses or ceramics are those which closely match the selected thermoplastic in refractive index over a wide wavelength range as well as give optimal properties to the composite. Any refractive index or CTE mismatch between the glass (or ceramic) and the polymer should be kept at the lowest possible in order to obtain transparent composites that can be efficiently injected and cured during the injection molding process. In addition, the CTE of the optical material should be such that does not affect the curvature of the meniscus during the curing of the material. For this reason, it may be preferable to select optical materials that can shrink isotropically under the influence of actinic radiation.

Moldplate Structure

Moldplate cavities with desired geometries can be created in a metal or glass moldplate by known processes by simply approximating the shape of the cavity to the desired optical element profile. Known processes such as reactive ion etching (RIE), deep reactive ion etching (DRIE), laser ablation, machine tooling, and the like may be suitable for fabricating moldplates with cavities of a predetermined optical shape. However, in order to achieve the results and advantages expected in accordance with the various embodiments of the present invention, it may be preferred that a moldplate material may be selected (predetermined) in accordance with at least one or more of the following parameters: Parameter 1: a predetermined moldplate material made of a material having a low coefficient of thermal expansion is highly desirable. For illustration purposes, the coefficient of thermal expansion of the moldplate material may be at least 3 times, or more preferably 10 times, lower that the coefficient of thermal expansion of the optical material. Parameter 2: In order to obtain uniform separating forces between the moldplate material and optical material, a moldplate material with isotropic thermal expansion properties may be desirable. Parameter 3: it may also be preferable that, during the curing process that leads to the formation of the optical element, the moldplate material shrinks at a lower rate than the optical material. Parameter 4: a moldplate material with a high melting point (i.e., high resistance to temperature) may be desirable. High resistance to temperature is desirable to improve wear resistance and lifespan of the moldplate. Parameter 5: a moldplate material that can provide sufficient surface tension between the surface of the optical material and the surface of the cavities' walls is highly desirable. As discussed above, surface tension between the moldplate material and the injected optical material will provide an appropriate meniscus curvature. Examples of a predetermined moldplate material that would meet most of the above parameters are molybdenum, molybdenum alloys, nickel and alloys thereof. Further details regarding preferred moldplate materials are discussed in copending patent application Ser. No. 12/603,565, which is incorporated herein by reference for all purposes.

FIG. 3 illustrates an example of a moldplate 20, as contemplated by an embodiment of the present invention. In FIG. 3, a plurality of cavities 25 are arranged preferably concentric to a spin axis 33. In such an arrangement, a first optical device may be formed at a first distance $r_1$ from the spin axis 33, a second optical device may be formed at a second distance $r_2$ from the spin axis 33, and even a third optical device can be formed at the location of the spin axis 33. In any type of arrangement, the geometry of the cavities can be designed such that both the first and second optical devices may have a same radius of curvature even after the moldplate has been spun around the spin axis 33. Alternatively, the first optical device formed at a first distance $r_1$ from the spin axis 33 can have a first radius of curvature, and a second optical device formed at a second distance $r_2$ from the spin axis 33 can have a second radius of curvature. In this instance, the moldplate cavities may be designed with a uniform geometric profile and the different curvatures of the optical devices can be provided by the force exerted on the optical material, while the moldplate spins. Moreover, when the second distance $r_2$ is greater than the first distance $r_1$, the first radius of curvature of the first element may be provided by a first meniscus curvature, while the second radius of curvature of the second optical element can be provided by a second meniscus curvature. In this latest case, the meniscus curvature can be adjusted by controlling the at least one of a viscosity of the optical material, a temperature of the optical material, a spin rate of the moldplate, a desired curvature of the optical device, the predetermined geometric profile of the cavity, a wall of the cavity, and a curvature of the predetermined optical profile.

Accordingly, it is possible to use this approach either to form a single micro-cavity (where the moldplate spin axis 33 could be the same as the center axis of the cavity) or for a multi-cavity moldplate (where at least some of the mold cavities are not aligned with the mold plate spin axis 33). In the latter case, the force exerted on the optical material by the spinning moldplate would vary depending on the location of the moldplate cavity with respect to the spin axis 33 of the moldplate 20. This relationship can be determined experimentally for a given moldplate spin rate, cavity geometry, and lens material viscosity. Thus, a predictable geometry for any of the mold plate cavities can be established.

Figure 4:
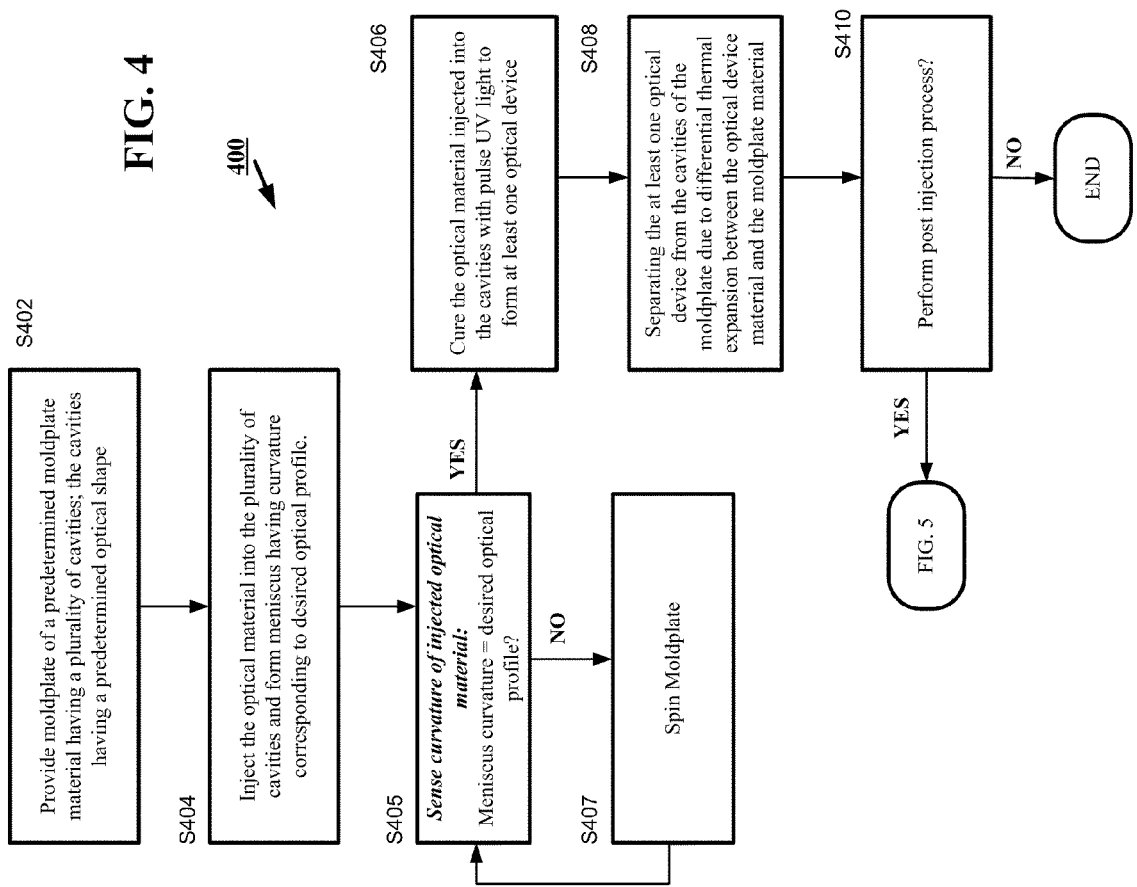
FIG. 4 shows a flow chart illustrating example method steps for the fabrication of optical components by an injection molding process, as contemplated by one embodiment of the present invention.

In the illustration of FIG. 3, optical elements being formed in cavities further from the spin axis 33 may achieve a different curvature than those closer to the axis. This effect could be exploited deliberately to produce a range of different types of micro-optical elements from a single mold plate, or it could be compensated by varying the mold plate cavity design to produce a uniform array of optical elements. In the case that a uniform array of optical elements is desired, the moldplate cavities need not be concentric to the spin axis 33. That is, optical elements may be distributed in two-dimensional matrix-type array and still be formed with high-precision dimensions by applying the above-described meniscus effect and moldplate spinning Process for Fabrication of Injection molded Optical Elements FIG. 4 shows a flow chart illustrating example method steps for the fabrication of optical components by an injection molding process 400, as contemplated by at least one embodiment of the present invention. The method starts at step S402, by providing an appropriate moldplate (e.g., moldplate 20 in FIG. 1 and FIG. 3) made of a predetermined moldplate material and having a plurality of cavities configured to receive injected optical material within the walls of the cavities. Preferred moldplate materials, such as metals or metal alloys are fully discussed in reference to FIG. 1 above, and—in particular—in copending patent application Ser. No. 12/603,565, which is incorporated herein by reference for all purposes. Preferably, each of the plurality of cavities is configured to have a predetermined shape (e.g., predetermined geometry) that approximately corresponds to a profile of the desired optical element to be manufactured. As noted above, optical shapes of a symmetrical geometry may be preferable for this process. However, this approach can be applicable to any type of optical element structure, including spherical and aspherics used in mobile camera and video phones, micro-projection systems, or any other application which uses such optical elements whether individually or as an array. An example of an application for arrayed optical elements of the type described in this application is a microlens array for liquid crystal displays (LCD).

At step S404, an appropriate optical material is injected into the plurality of cavities in accordance with preferred injection molding parameters. Preferred parameters may include a predetermined optical material temperature, flow rate and pressure for injecting the optical material, viscosity of the optical material and the like. For example, it may be desirable that the optical material be maintained in a molten state (liquid if possible and preferably above the glass transition temperature) by controlling the temperature of the injection molding machine, as described in previous sections of this specification. In addition, optimal behavior of the optical material (e.g., material stress levels caused by thermal expansion/contraction) may be predetermined by numerical simulation and/or empirical experimentation so at to more precisely control parameters such as temperature, injection flow rate and pressure, as well as viscosity of the optical material. Once the optical material has been injected into the cavity, the injected optical material forms a meniscus due to a surface tension of the optical material contained within the walls of the cavity, whereby a meniscus having a shape (e.g., curvature) corresponding to the predetermined optical profile of the desired micro-optical element of formed. As previously discussed, cavities with different geometrical shapes may provide different meniscus curvatures.

In order to ensure that the appropriate meniscus curvature has been achieved, at step S405, a surface sensor 65 (in FIG. 1) is used to measure the surface shape of the optical material injected in the cavities. If the meniscus curvature matches the optical profile of the desired optical element within an acceptable tolerance (YES at step S405), the process advances to step S406. Alternatively, if the meniscus curvature is not within the acceptable tolerance (NO at step S405), the process advances to step S407.

At step S407, control station 40 activates motor (M) 70 and initiates rotation (spinning) of moldplate 20. More specifically, in the context of the present application, spinning moldplate 20 includes spinning the moldplate containing the injected optical material at a controlled rate, such that the meniscus effect controls the profile (e.g. curvature and focal length) of the desired optical element. A controlled rate means that the spin rate is preferably stabilized at a desired rpm (revolution-per-minute) rate to within a controlled tolerance, say 5%, in order to achieve the desired lens profile. The preferred rate of rotation will vary depending on the type of meniscus curvature desired, viscosity of the injected optical material, shape of the moldplate cavity, and possibly other factors. For example, it is expected that a minimum a 5-10 rpm as a lower limit can achieve sufficient enhancement to the meniscus effect. The rpm upper limit would only be limited by what can be technically achieved in terms of rotational speed and meniscus flatness to obtain the most precise dimensions for the desired optical component.

Controlling the rate of spinning may include at least a motor and a microcontroller, which in case of FIG. 1 is illustrated as control station 40. In the arrangement of FIG. 1, the drive voltage of the motor 70 could be controlled to adjust the spin rate, for example. As a result, as noted above, it is possible to design various combinations of cavity wall shape and spin rate to achieve different radii of curvature on the desired optical element 50. Generally, for mold cavities close to the axis of rotation (spin axis 33 in FIG. 3) of the moldplate 20, higher spin rates will result in a more pronounced radius of curvature for a given moldplate cavity geometry. Alternatively or in addition to the above, the spin rate of the moldplate could be regulated dynamically using a laser profilometer reflected from the optical element meniscus surface at an angle while the moldplate is spinning. That is, while the moldplate 20 spins around spin axis 33, the spin rate of the moldplate and the curvature of the meniscus can be monitored and controlled by control station 40 so as to obtain an appropriate meniscus curvature that substantially matches a predetermined optical profile of the desired optical element 50 to within a predetermined tolerance.

Returning to FIG. 4, after spinning the moldplate 20 (step S407), the process flows to step S405, where curvature of the injected optical material is again tested to determine whether or not the meniscus curvature matches the desired optical profile. If the desired optical profile is within a reasonable tolerance limit, the process now advances to step S406.

At step S406, after the optical material has been injected into the cavities of the moldplate and the appropriate meniscus has been formed, the process starts the curing of the optical material to form the desired optical element. Preferably, curing is done with a curing device configured to generate high-intensity pulses of actinic radiation (e.g., UV light), as describe above in reference to FIG. 1. As previously noted, the pulse duration, number of pulses, and other details could vary depending, among other things, on the specific optical material chosen, the profile of the desired optical device being formed, the geometry of the moldplate cavities, and the like. For illustrative purposes, about 3-4 W of UV energy, delivered in a train of 5 pulses each being tens of microseconds long to achieve at least 1% shrinkage by volume of the optical material may be suitable for some applications. In other applications, for different material sets and/or different optical device geometries, UV pulses of different energy and different pulse duration, or even continuous UV or other type of radiation, may be required, as will be apparent to those skilled in the art. It should be noted, however, that high energy pulses of electromagnetic radiation in the UV range are preferable because UV has the highest energy due to its short wavelength. Nevertheless, other EM radiation wavelengths may also work. Pulsed EM irradiation is preferred to encourage the differential thermal expansion or photopolymerization forces to separate the optical device more gradually from the moldplate cavities.

At step S408, the separation of the optical device from the cavities occurs spontaneously due to the differential thermal expansion between the optical material and the moldplate material. Once the newly formed optical element naturally dislodges from the cavities of the moldplate 20, at step S410, optional steps (such as a post injection process) may be performed. If optional steps are required, the process advances to FIG. 5. Alternatively, if no optional steps are required at step S410, the newly formed optical element is removed from the cavities, preferably without the use of removing forces or mechanical tools so as to prevent damage of the newly formed optical element, whereby the injection molding process ends.

Optional steps (or post injection process) may be required, for example, when the newly formed optical element requires to be transferred onto an optoelectronic device. Specifically, it is contemplated by the present invention, that the above-described injection processes may be applicable to the fabrication of optical components in the micro or nanometer scale. Micro or nanometer scale optical components are often fabricated in arrays suitable for wafer-scale processing. Accordingly, such micro or nanometer scale optical elements may need to be transferred to appropriate wafer-scale processing, as more fully described in the following sections in reference to FIGS. 5-7.

Alternatively, as previously noted, the above-described injection process may be applicable to the fabrication of optical devices in macro scale. For example, optical devices such as lenses and/or filters for standalone imaging electronic devices such as cameras, projectors, scanners and the like. In the case that the newly formed optical device is in the macro scale, no additional steps may be required after the optical device has naturally retracted away from the cavities of the moldplate. Accordingly, the process ends after step S410 (i.e., after removing the newly formed optical device from the moldplate cavities without the use of mechanical demolding devices).

It should be noted that in the above-described injection molding process, the moldplate cavities may be with or without a conformal coat of release layer. The main objective of using the coat of release layer is to facilitate separation of the newly formed optical element from the cavities of the moldplate. A complete description concerning the use of a release layer of prevention thereof is presented in copending patent application Ser. No. 12/603,565, which is incorporated herein by reference for all purposes.

Post Injection Processes

FIG. 5 illustrates exemplary steps for a post injection process, in accordance with an embodiment of the present invention. A post injection process may be desirable or even required, for example, in instances in which the newly formed optical components are of the micro or nanometer scale, and a transfer of the optical element onto a wafer-scale device is appropriate. For example, if the newly formed optical element is a microlens or microfilter, such a device may be transferred onto an active optoelectronic device such as a photodiode, a photo detector or the like, so that wafer-scale assembly may take place. Alternatively, a post injection process may be desirable for inspecting the newly formed optical device(s) to confirm that the desired optical shape and properties have been achieved.

In FIG. 5, post injection process 500 flows from step S410 of either process 400. At step S502, after the optical element has been cured, but prior to removal, the moldplate 20 (in FIG. 1) containing therein the newly formed optical components may be aligned with, and clamped onto, an alignment tool 600 using conventional photolithographic techniques, as shown by FIGS. 6A and 6B, respectively. Specifically, FIGS. 6A and 6B show the alignment of moldplate 20 containing newly formed microlenses 61 with an alignment tool 600 and a clamping tool 605 with the use of alignment keys 608.

At step S504, as illustrated in FIGS. 6C and 6D, the newly formed optical components, in this case microlenses 61, are transferred onto an active optoelectronic device 610 (FIG. 6C), and subsequently separated therefrom (FIG. 6D) without the use of mechanical tooling.

At step S506, after the newly formed optical components have been transferred, the post injection process 500 may be used for testing the newly formed optical device(s). If testing is selected (YES at step S506), the process advances to step S508, where appropriate testing is performed and a determination is made as to whether or not the optical element meets predefined parameters such as curvature, diameter, transmittance, refractive index and the like. If at step S508 the optical element meets the predefined parameters (YES at S508), the optical element may be marked as tested/approved and the process ends.

Alternatively, if at step S508, the newly formed optical element does not meet the predefined parameters (NO at step S508) the process advances to step S510. At step S510, depending on the level of error (e.g. tolerance permitted) in the newly formed optical element, an attempt can be made to correct the error and re-test the optical component, or the optical device may simply be discarded—if the error is greater that a maximum tolerance permitted. An example of error correction during testing may include submitting the newly formed optical element to a conventional reflow technique so as to modify or improve predefined parameters such as curvature, diameter or index of refraction. In this case, the optical element may successively be determined whether to be tested or not at step S506 until the device meets the predefined parameters or is discarded.

FIG. 7 shows an exemplary testing arrangement 700 for testing predefined parameters of newly formed optical components, such as microlenses 71. In the arrangement of FIG. 7, a plurality of microlenses 71 has been transferred onto a testing platform 701, for example, a transparent wafer-scale substrate. An array of different wavelength sources 710 (e.g., laser diodes) may be provided in correspondence with an array of wideband photodetectors 705. In such an arrangement of FIG. 7, various testing procedures may be performed so as to test if the microlenses 71 meet predefined parameters. For example, the microlenses 71 may be tested for focusing distance, wavelength response, transmittance levels and the like.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The foregoing embodiments and examples were chosen and described in order to best explain the principles of the invention and the practical application, and to enable others of ordinary skill in the art to understand the invention for various embodiments with various modifications as are suited to the particular use contemplated.

What is claimed is:

1. A method for fabrication of injection molded optical elements, the method comprising:
   providing a moldplate made of predetermined moldplate material, the moldplate having one or more cavities configured to receive injected optical material within walls of said one or more cavities, each of said one or more cavities having a predetermined geometric profile approximately corresponding to a predetermined optical profile;
   injecting the optical material into the one or more cavities of said moldplate, the injected optical material forming a meniscus due to a surface tension of the optical material contained within the walls of said one or more cavities such that the optical material does not physically contact a region where the walls of the cavity meet, the meniscus having a shape corresponding to the predetermined optical profile;
   curing the optical material contained with the walls of the one or more cavities such that an optical element having the predetermined optical profile is formed in each of said one or more cavities of said moldplate.

2. The method according to claim 1, wherein the shape of the meniscus is adjusted to match said predetermined optical profile by spinning the moldplate about a spin axis.

3. The method according to claim 1, further comprising:
   separating the formed optical element from the walls of said one or more cavities of said moldplate, wherein
   the separating step includes at least one of (i) pulling the optical element away from the walls of said one or more cavities with a vacuum chuck, and (ii) shrinking the optical material such that the optical element pulls away from the walls of said one or more cavities due to a differential thermal expansion between the optical material and the moldplate material.

4. The method according to claim 1, wherein the curing step includes exposing the optical material contained within the walls of said one or more cavities to pulsed UV light at a predetermined power.

5. The method according to claim 4, wherein the optical material forming the optical element shrinks at least 1% by volume of the optical element.

6. The method according to claim 5, wherein the predetermined moldplate material includes at least one of metal and glass.

7. The method according to claim 6, wherein the optical material includes at least one of a polymer material and a material susceptible to photopolymerization.

8. The method according to claim 1, wherein the walls of said one or more cavities include at least one of a perpendicular wall, a chamfered wall and a curved wall selected in accordance with said predetermined geometric profile.

9. The method according to claim 2, wherein said one or more cavities are concentric to said spin axis.

10. The method according to claim 9, wherein each of a first optical device formed at a first distance from the spin axis and a second optical device formed at a second distance from said spin axis has a same radius of curvature.

11. The method according to claim 9, wherein:
   a first optical device formed at a first distance from the spin axis has a first radius of curvature, and a second optical device formed at a second distance from said spin axis has a second radius of curvature,
   said second distance being greater than said first distance and said first radius of curvature being greater than said second radius of curvature.

12. The method according to claim 2, wherein the shape of the meniscus in each of said one or more cavities is adjusted in correspondence with a position of said one or more cavities with respect to said spin axis.

13. The method according to claim 2, wherein the shape of the meniscus is adjusted in accordance with at least one of a viscosity of the optical material, a temperature of the optical material, a spin rate of the moldplate, a desired curvature of the optical device, the predetermined geometric profile of the cavity, a wall of the cavity, and a curvature of the predetermined optical profile.

14. The method according to claim 2, wherein the curing step is performed only after the spinning moldplate has reached a predetermined rotation speed.

15. The method according to claim 14, wherein said predetermined rotation speed is dynamically controlled to obtain the shape of the meniscus within a 5% tolerance of said predetermined optical profile.

16. The method according to claim 15, wherein the spin rate of the moldplate is regulated dynamically using a laser profilometer reflected from the meniscus surface while the moldplate is spinning.

17. A method for spin-mounted fabrication of injection molded micro-optics, the method comprising:
provising a moldplate made of predetermined moldplate material, the moldplate having one or more cavities configured to receive injected optical material within walls of said one or more cavities, each of said one or more cavities having a predetermined geometric profile approximately corresponding to a predetermined optical profile;
injecting the optical material into the one or more cavities of said moldplate such that the optical material does not physically contact a region where the walls of the cavity meet;
spinning the moldplate about a spin axis such that the optical material contained within the walls of said one or more cavities forms a meniscus having a shape corresponding to said predetermined optical profile;
curing the optical material injected into the one or more cavities such that an optical element having the predetermined optical profile is formed in each of said one or more cavities of said moldplate.

* * * * *